June 6, 1961  L. N. YOHE  2,987,702
EMERGENCY SIGNAL LAMP
Filed Dec. 17, 1958

INVENTOR.
LESTER N. YOHE
BY
AGENT

United States Patent Office 2,987,702
Patented June 6, 1961

2,987,702
EMERGENCY SIGNAL LAMP
Lester N. Yohe, 1601 Melrose Ave., Havertown, Pa.
Filed Dec. 17, 1958, Ser. No. 781,050
1 Claim. (Cl. 340—81)

The invention hereinafter described and claimed has to do with signal lamps and more specifically to signal lamps of the flashing type which are particularly useful for emergencies.

While of much broader applicability the present invention finds its best usage in cases of emergency in connection with automobiles, trucks and other vehicles. Many fatal accidents have resulted from the lack of proper signal lights when such vehicles have stalled or otherwise become disabled on a roadway or high speed highway, such as a turnpike. Many of such accidents might have been prevented if the driver had been equipped with an adequate signal lamp.

Therefore it is the primary object of the present invention to provide such a signal lamp particularly useful under emergency conditions to signal such conditions to others in or approaching the vicinity in which the emergency condtion exists.

It is another object of the invention to provide such a signal lamp which is of the flasher type and adapted for use in connection with automobiles or other battery-operated vehicles.

Still another object of the invention is to provide an emergency signal lamp which is operable over a wide range of voltages thereby to accommodate itself to vehicles of many types.

It is also an important object of the invention to provide a novel control circuit for such lamps.

A further object of the invention is to provide a signal lamp of the flashing type which is operable from the cigar lighter socket of a vehicle.

Still further, it is an object to provide such a signal lamp which is characterized by its small size, its ease of operation, its brilliance of operation, and its ease of attachment to the vehicle at the most favorable position to be viewed when in operation.

In accordance with the above objects and first briefly described, the invention comprises a lamp of suitable voltage and candlepower connected in a novel circuit for causing the lamp to flash on and off rapidly and continuously while connected to a source of power, such as the battery of an automobile. The lamp is positioned in a housing having a lens colored in accordance with the applicable regulations, for example, red for a danger signal or for police use, or blue for civilian defense or auxiliary firemen, thus to indicate the emergency condition for long distances.

In the drawings illustrating a preferred embodiment of the invention:

Figure 1:
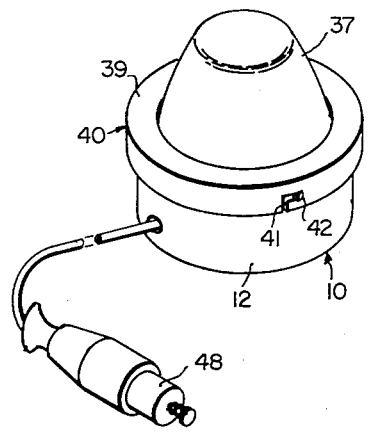
FIG. 1 is a perspective view of apparatus embodying the invention.
Figure 3:
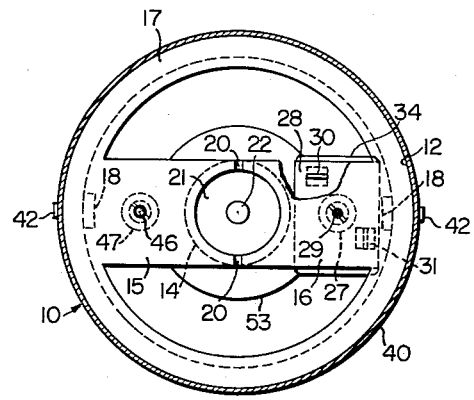
FIG. 3 is a view taken along the line 3—3 of FIG. 2.

In accordance with the preferred embodiment, the invention comprises a cup-like base member 10 having a bottom wall 11 and a continuous side wall 12 terminating in a flat rim 13. A lamp socket 14 is supported within the central portion of base 10 by a pair of oppositely extending flanges, or arms, 15 and 16, having their ends fixed to a ring-shaped element 17 seated on rim 13 and aligned therewith by depending lugs 18 spaced about the inner periphery of the ring. It is understood, of course, that the socket 14, the flanges 15 and 16, the ring 17, and the lugs 18 can all be formed separately and then suitably secured together, but it is preferred to form them as a unitary casting, as shown.

The socket is of a conventional type including oppositely positioned bayonet slots 20 and an insulating disk 21 carrying a contact element 22. The disk is urged upwardly by a coil spring 23. A lamp bulb 24 is inserted in the socket 14 by aligning its oppositely positioned lugs with bayonet slots 20 and pressing downwardly against the pressure of spring 23 until the lugs bottom at the end of the slots, then turning the lamp to move the lugs into the transverse portion 25 of the slots. When thus inserted the pressure of spring 23 urges contact 22 into tight electrically conductive relation with the bottom contact 26 of the lamp. It is to be understood that lamp 24 may be of other suitable voltages but one of 12 volts, 21 candlepower, and of about 1 ohm resistance, is preferred in this embodiment.

Flange portion 16 carries a depending lug 27 having an electrically insulating panel 28 secured thereto as by screw 29. The panel is provided with electrically conductive terminals 30 and 31 of the socket type for receiving the terminal pins 32 and 33 of an on-and-off flasher element 34, thus both to mount the element 34 on panel 28 and to provide the means for connecting it in the electrical circuit, to be more fully described hereafter.

The flasher element 34 may be of other suitable types but it has been found that a bimetallic flasher manufactured commercially by the Signal-Stat Corporation of Brooklyn, N.Y., and identified by the number ZN 232 12v, serves the purpose quite satisfactorily. This element comprises generally a normally closed bimetallic switch 35 (FIG. 4), the bimetallic element 36, which is of suitable resistance, say 2.5 ohms, heats up and snaps to open the switch when current is passed through it. As soon as the switch opens the current is off, permitting the bimetallic element to cool and snap back to close the switch again. The action of opening and closing occurs rapidly and repeatedly until the current source is removed.

Covering the open end of housing 10 is a lens element 37 which, as mentioned above, may be of any suitable color, or even a combination of colors. The lens is of inverted cup, or bell shape, and arches upwardly over lamp 24 which extends above the rim 13 of base member 10. The bottom edge of the lens is provided with an outwardly extending flange 38 having the same outer diameter as walls 12 of base 10 whereby the inturned flange 39 of a ring-like member 40 may overlie and secure the lens to the base when the ring-member is secured to the base by engagement of its bayonet slots 41 with lugs 42 extending outwardly from wall 12. It is understood, of course, that other suitable means may be used for securing the lens upon rim 13. A gasket G is positioned between the ring 17 and the flange 38 of the lens to absorb the pressure of flange 38 when the unit is assembled.

Figure 2:
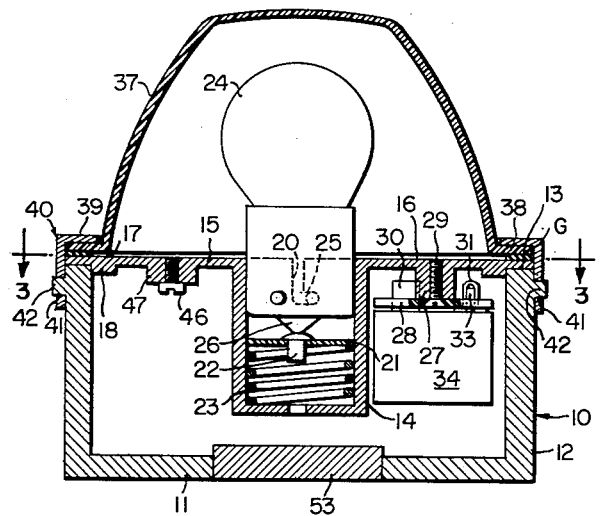
FIG. 2 is a vertical sectional view of the apparatus shown in FIG. 1.
Figure 4:
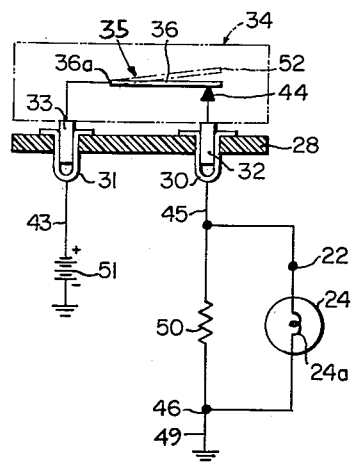
FIG. 4 is a circuit diagram.

A particular feature of the invention resides in the novel control circuit for the lamp. As seen in FIG. 4 of the drawings, the positive side of the input is connected to one side 36a of the bimetallic element 36 through the medium of conductor 43, which includes pin 33 and socket 31 when the flasher element 34 is plugged into panel 28. Simultaneously the switch contact 44 which is in the flasher unit 34, is connected by pin and socket 32 and 30 to lamp contact 22 by means of conductor 45. The other, or negative, lamp contact is to ground through the lamp socket and the ground connection 46 on a lug 47 formed on flange 15 (FIG. 2). The power input to the unit may be by other convenient means but to make the device most useful as an emergency lamp for motor vehicles, the input in this embodiment, is through the cigar lighter socket (not shown) of such vehicles. To this end the unit is provided with a plug 48 (FIG. 1) suitable for this purpose. The ground wire 49 of the plug is connected to flange lug 47, while the positive wire 43 is connected to terminal 31, as heretofore mentioned.

Connected between contact 44 of the flasher 34 and the ground side of lamp 24, in parallel with lamp filament 24a, as seen in FIG. 4, is a resistance 50 which in this embodiment may have a value of from 4.5 to 8 ohms. However, one of 6.5 ohms is preferred when using a 12 v. lamp, and a voltage supply within the range of 6 to 12 volts. It is this resistance which imparts the desired flexibility in the use of this invention as it is this element which makes it possible for the unit to be used with a range of voltages including both the 6 and 12 volt batteries in common use on present day motor vehicles.

Of course the unit is not to be considered so limited in use, as by a judicious selection of one of a wide range of ohmic values this resistance make the device useful for other purposes and for other vehicles, such as aircraft, or boats. For example, some emergency regulations may require a specific frequency of flashing. With the present circuit this is easily accomplished. By holding a specific voltage in the power supply, fixing the resistances of the bimetal element and the lamp, and selecting a specific resistance element in the parallel portion of the circuit, i.e., within the range of 4 to 16 ohms, the required frequency of flashing may be obtained.

In the operation of the unit, plug 48 is inserted in the cigar lighter socket of the vehicle, thus to connect the unit to the battery 51 of the vehicle. When thus connected, current flows through conductor 43, bimetallic element 36, contact 44, conductor 45 and in parallel through resistance 50 and filament 24a of lamp 24 to ground through conductor 49. The amperage drawn by the lamp filament and the resistance causes the bimetallic strip 36 to become heated which causes the strip to snap upwardly—as illustrated by dotted lines 52 in FIG. 4—thus to open switch 34, and the lamp goes out. The strip 36 then cools and snaps back against contact 44, again completing the circuit to light the lamp. Such on-and-off flashing operation of the lamp is rapidly repeated so long as the unit is connected to a source of potential. Flashing of the lamp alternately brilliantly illuminates the lens 37 which thus is made visible to attract other people in or approaching the vicinity of the flashing lamp to make them aware of the emergency condition.

To make the unit even more flexible and convenient to use, the bottom 11 of base 10 is provided with a permanent magnet 53 (FIG. 2) which enables the unit to be easily attached to any metallic part of the vehicle.

What is claimed is:

A signal lamp comprising: a housing including, a base member of cup-like configuration having a flat bottom wall and integral side walls extending upwardly from said bottom wall and terminating in a rim defining an opening, a lens of bell-like configuration, the mouth of said lens bell being provided with an outwardly extending flange fitting on said rim, and a first ring-shaped member having a portion extending partially down the side walls of the base member whereby it is releasably secured around the housing side wall at said rim, said first ring-shaped member including an inwardly turned portion overlying said outwardly turned flange of said bell to secure said lens to the rim of said base over said opening with the bell extending away from the base; a lamp socket; means mounting said lamp socket to support a lamp bulb within said housing with the lamp filament positioned in said lens bell, said lamp socket mounting means comprising a second ring-shaped member secured to said rim between said rim and said lens flange, and oppositely extending flanges connecting said socket to said second ring-shaped member; means for connecting said lamp socket to a source of voltage external of said housing; a flasher switch secured to one of said oppositely extending flanges for causing said lamp to flash on and off repeatedly when connected to said voltage source; and a permanent magnet imbedded in the bottom wall of said base member whereby said housing may conveniently and magnetically be attached to a magnetizable supporting surface.

References Cited in the file of this patent

UNITED STATES PATENTS

| | | |
|---|---|---|
| 1,635,372 | Lippert | July 12, 1927 |
| 1,641,880 | Cohen | Sept. 6, 1927 |
| 2,638,584 | Fortney | May 12, 1953 |
| 2,647,222 | Nieset | July 28, 1953 |
| 2,684,476 | Trempe | July 20, 1954 |
| 2,714,692 | Nupp et al. | Aug. 2, 1955 |
| 2,804,611 | Craddock | Aug. 27, 1957 |
| 2,835,879 | Du Rocher et al. | May 20, 1958 |